United States Patent [19]

Gorman et. al.

[11] Patent Number: 4,465,151

[45] Date of Patent: Aug. 14, 1984

[54] WEIGHSTATIONS AND REMOTE CONTROL THEREOF

[76] Inventors: Leonard F. Gorman, 3A Highlands Rd., Heath End, Farnham, Surrey; Harold E. Brooks, 10A Oakley Dr., Fleet, Hampshire, both of England

[21] Appl. No.: 356,396

[22] Filed: Mar. 9, 1982

[30] Foreign Application Priority Data

Mar. 10, 1981 [GB] United Kingdom ............... 8107462

[51] Int. Cl.³ ............................................. G01G 19/02
[52] U.S. Cl. ...................................... 177/133; 177/25; 340/870.03; 455/66
[58] Field of Search .......................... 177/25, 133–135, 177/245; 364/567, 424; 455/54, 66, 619; 340/22, 870.03, 870.02

[56] References Cited

U.S. PATENT DOCUMENTS

| | | | |
|---|---|---|---|
| 3,842,922 | 10/1974 | Fagin | 177/134 X |
| 4,031,513 | 6/1977 | Simciak | 340/870.03 |
| 4,119,948 | 10/1978 | Ward | 340/870.02 |
| 4,138,735 | 2/1979 | Allocca | 177/25 X |

OTHER PUBLICATIONS

Ceramic Pyroelectric Infrared Detectors, Mullard, London, 1978, Technical Note 79, JP1664, p. 8.

Primary Examiner—Joseph W. Hartary
Attorney, Agent, or Firm—Young & Thompson

[57] ABSTRACT

A weighstation which includes a weighbeam and is arranged to provide indications of axle loadings of a vehicle as the vehicle passes over it has a transmitting and receiving unit which is adapted for cooperation with a remote controller situated in the cab of a vehicle. The remote controller is arranged to initiate the operation of the weighstation and for this purpose transmits by way of an infra-red link a command signal and a further set of signals denoting the number of axles possessed by the vehicle. The unit in the weighstation provides as the vehicle passes over the weighbeam signals denoting the axle loadings of the vehicle and transmits these signals to the remote controller together with further signals which are used by the remote controller to provide a visible indication in the cab of the vehicle of the axle loadings of the vehicle and such further information as may be desired, such as time of day.

2 Claims, 4 Drawing Figures

WEIGHSTATIONS AND REMOTE CONTROL THEREOF

BACKGROUND TO THE INVENTION

This invention relates to the weighing of vehicles, particularly commercial goods vehicles, and the remote control of weighing stations used for that purpose.

The use of weighing stations to measure axle loadings of vehicles assumes greater importance as axle loadings increase and legislation relating to the maximum permissible loading is enacted or the desire to enforce such legislation increases. However, currently available weighing stations are not well adapted to serve the needs of those who might have cause to use them. For example, the installation of a weighing station on the premises of a haulier is of little use if the business of the haulier requires that his vehicle should leave his premises normally unloaded. Moreover, the installation of weighing stations at places rather more convenient for a haulier, such as by the roadside, is undesirable at present owing to the vulnerability of unattended weighing stations or the inconvenience and expense of manned weighing stations.

One object of the present invention is to extend the feasibility of the use of weighing stations on a larger scale than at present and a further object of the present invention is to make weighing stations and their use more convenient.

It is known to provide a weighing station which is adapted to provide a measure of axle loading of a vehicle while the vehicle is in motion over a weighing beam and preferred embodiments of a weighing station in accordance with the invention are arranged to operate in such a manner.

SUMMARY OF THE INVENTION

The basis of the present invention is the remote control of a weighing station by means of a controller which is preferably adapted for incorporation in a vehicle and which is preferably provided in a form in which it can be, as far as its controls or display devices are concerned, conveniently installed in the driver's cab of a vehicle, for example a commercial goods vehicle. One aspect of the present invention is the construction and manner of operation of such a controller. Another aspect of the present invention is the manner of operation of a weighing station which is arranged to cooperate with a remote controller as aforesaid.

In a preferred form, a remote controller for a weighing station is according to the present invention adapted for incorporation in a vehicle and comprises means for transmitting signals to a weighing station, said signals including a command signal and a signal denoting the number of axles possessed by the vehicle, means for receiving signals from the station and means for processing the received signals to provide representations of the loading of the various axles of the vehicle. It is preferable that the controller includes means for comparing the representations of the loadings of the vehicle's axle with reference signals so as to provide indications of overload. Such a controller may include means for providing a visible indication, or visible record, of the loadings. Such a record could take the form of a printed ticket identifying the axles, the loadings thereon, the gross weight of the vehicle and other information, including the date and time. The controller may include, for a purpose hereinafter explained, means for receiving from the weighing station signals modulated by speech and for reproducing the speech thus transmitted to the controller.

Preferably signals are transmitted between the remote controller and the cooperative unit in the weighing station by means of at least one infra-red transmission link.

The controller may include a manually operable control panel by means of which the transmission of signals to the weighing station may be initiated.

Another aspect of the invention concerns a cooperative weighing station which includes a unit adapted for cooperation with the remote controller. Such a weighing station preferably comprises a weighing beam disposed in a location over which the vehicle may pass and a unit, preferably disposed within an enclosure and including a receiver arranged to receive a command signal from a remote transmitter on the vehicle, means coupled to the weighing beam and responsive to the command signal to provide, as the said vehicle passes over the weighing beam, signals denoting the axle loadings of the vehicle, and a transmitter for transmitting these signals to the remote controller.

The station may include means for transmitting further signals to the remote controller. These further signals may include pre-recorded signals explaining the operation of the weighing station for the benefit of the driver of the vehicle which is to be weighed.

The signals which are transmitted to the weighing station may include such information as an account number for the user of the weighing station and the weighing station may be arranged to make a record of the user of the station so that the use of the station need not require the payment or storage of cash.

BRIEF DESCRIPTION OF THE ACCOMPANYING DRAWINGS

DESCRIPTION OF THE PREFERRED EMBODIMENT

It is generally envisaged in accordance with the present invention, that a weighing station be located at any convenient place, for example in a lay-by or service area. The weighing station may form part of a network of weighing stations throughout a region. Such a weighing station may be, and preferably is, unattended, the various transmitting receiving devices and processing devices associated with the weighing station being preferably made secure against unauthorised entry or vandalism. It is further envisaged that the driver of the vehicle which is equipped with a remote controller should, on arrival at the weighing station, initiate by means of a control panel associated with the controller, the operation of the weighing station. An optional feature is the consequent transmission by the weighing station of signals which when demodulated by the remote controller provide audible speech instructions for the driver of the vehicle. These instructions can indicate the manner in which the driver should proceed over the weighing beam and could include instructions for the operation of his controller. On the passage of the vehicle over the weighing beam, the unit within the weighing station transmits the signal aforementioned to the remote controller so as to provide in the remote controller a record of the result of weighing. It should be mentioned that according to current legislation a driver of an overloaded vehicle can escape penalty if detected only if the driver is proceeded to the nearest available weighing station or unloading point. However the present invention is intended to facilitate the enforcement of legislation and compliance with it.

Figure 1:
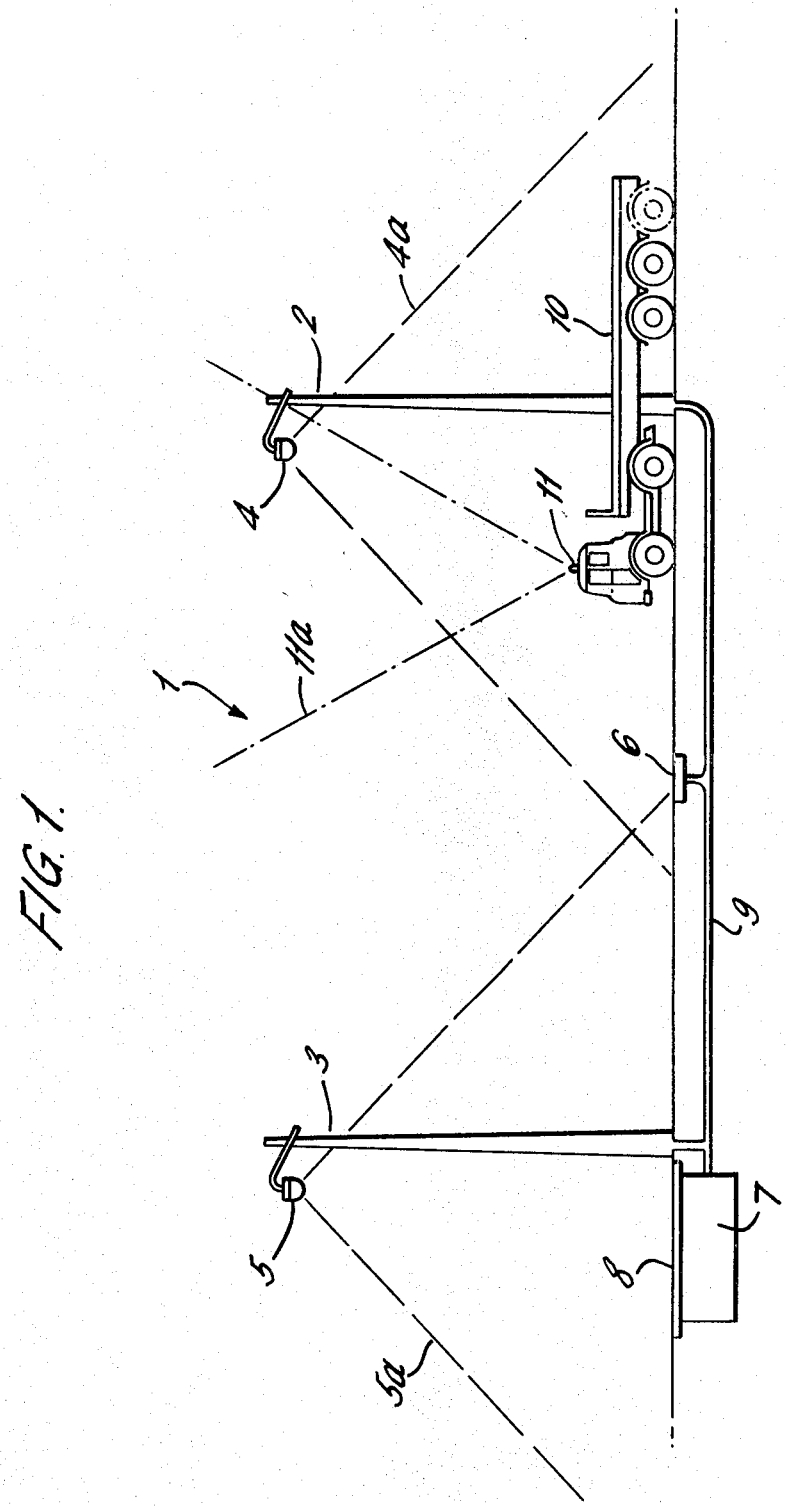
FIG. 1 is a general view of a weighing station and a vehicle using the same.

In FIG. 1 is shown diagrammatically an example of a weighing station laid out according to the present invention. This weighing station is, as mentioned hitherto, provided in some convenient place, such as a service area on a motorway or at a lay-by adjacent a highway. The weighing station 1 includes two spaced apart pylons 2 and 3. The pylons are preferably spaced apart by a distance substantially greater than the length of a commercial goods vehicle. The pylon 2 carries at its upper end a housing 4 containing a transmitter and receiver having a field of view 4a extending over a substanial region in the vicinity of the pylon 2. Likewise the pylon 3 has at its upper end a housing 5 containing a second transmitter-receiver pair with a field of view 5a extending over a substantial region in the vicinity of the pylon 3, this field of view 5a slightly overlapping field of view 4a.

Alongside the pylons, and optionally indicated by ground markings, is a roadway into which is built a dynamic weighbeam 6 which is preferably of known form. Such a weighbeam, currently in use, is of sufficient size to extend laterally to embrace the width of a vehicle and can support the wheels of a single axle. The weighbeam is supported on load cells arranged to provide an electrical signal proportional to the load applied to the weighbeam. Preferably in a typical (known) form the load cells are excited by a constant voltage source which is housed in a sub-assembly comprising input amplifiers and signal conditioning circuits. This sub-assembly provides voltage for bridge circuits associated with the load cells and also includes means for adjusting zero and full load output signals for each of the load cells. As has been mentioned, such a weighbeam and sub-assembly are in current use. In a commercial embodiment, there are preferably load cells associated with the leading edge and trailing edge of the weighing beam and a comparator which provides an output on detection of equality between the loading of the leading edge and trailing edge of the weighbeam, so as to indicate that the axle of which the wheels are on the weighbeam is disposed along the centre line of the weighbeam.

At some convenient location, preferably in the vicinity of the pylons, is a housing 7 which is preferably disposed in an underground cavity covered by a secure but removable platform 8, which can be removed to permit servicing or repair of the operative circuits of the weighing station. The circuits within the housing 7 are connected to the transmitters and receivers in the housings 4 and 5 and to the weighbeam 6 by cable ducts 9.

FIG. 1 also illustrates a commercial goods vehicle 10 which has entered the vicinity of the weighing station and is waiting adjacent the first pylon 2. It is presumed that this vehicle 10 is provided with the remote controller as will be described hereinafter and has at some convenient place, for example the roof of the driver's cab, a transmitter and receiver assembly 11 having a field of view 12 directed upwardly so that the transmitter and receiver 11 can communicate with either the transmitter and receiver in the housing 4 on the first pylon 2 or the transmitter and receiver in the housing 5 on pylon 3, according to the position of the vehicle.

Figure 2:
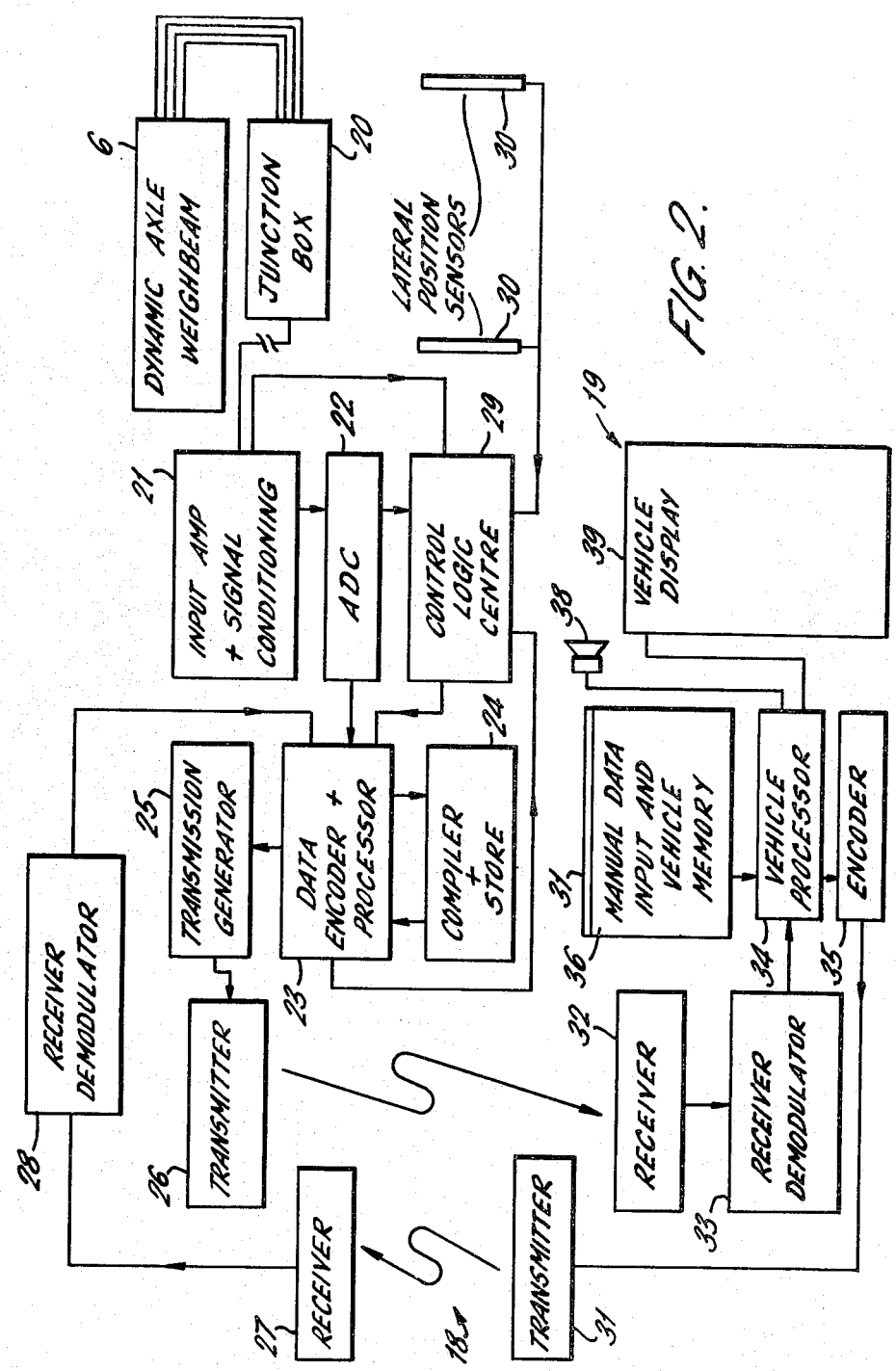
FIG. 2 is a schematic block diagram of the operative circuits of the weighing station and a remote controller for use on the vehicle.

FIG. 2 illustrates in schematic block diagram form the various parts of the weighstation 18 and the cooperative remote controller 19.

In the weighstation, the weighbeam 6 as hereinbefore described is connected via a junction box 20 to input amplifying and signal conditioning circuits 21. These circuits are coupled by way of an analogue-to-digital converter 22 to a data encoder and processor 23, which is associated with a store 24. The processor 23 is also coupled to a transmission generator 25 to transmitters 26, of which only one is shown but would be provided in both the housings 4 and 5 in FIG. 1. A receiver 27 in each housing 4 and 5 is coupled by way of a demodulator 28 to the processor unit 23.

A control logic centre 29 is coupled to the processor 23, the analogue-to-digital converter 22 and the signal conditioning circuit 21 and can receive inputs from lateral position sensors 30 which may be provided one on each side of the roadway extending through the location of the dynamic weighbeam.

The remote controller 19 includes a transmitter 31 and a receiver 32. The receiver 32 is coupled by way of a demodulator 33 to a processor 34 which is also coupled by way of an encoder 35 to the transmitter 31. The processor 34 can receive input signals from a unit 36 which may include a control panel 37, a loudspeaker unit 38 and a display device 39.

To a very large extent the arrangement of the individual component blocks in the weighstation and the remote controller may be commercially available items which require no detailed description apart from a reference to the part that each plays in the organisation of the system. The programming arrangement of individual components in a data transmission system which requires only simple computing and storage is well within the capacity of those skilled in the art and having regard to the state of the art it is considered sufficient merely to indicate the functional organisation of the system and the manner in which the weighstation can be used. The choice of methods of data handling, processing, coding and transmission is well within the purview of the designer.

There follows a description of the manner in which the weighstation is used in practice and of the organisation of the system of weighstation and remote controller for that purpose.

Initially, the vehicle, such as the vehicle 10, enters the vicinity of the weighstation and comes to a halt in, for example, the position shown in FIG. 1.

The operation of the weighstation is initiated by signalling from the vehicle to the weighstation. The control panel 37, in conjunction with the data input unit 36 and the vehicle processor 34 to provide, on operation of the panel 37, a command signal which may merely be a "start" or "I am here" signal and include, either by operation of pushbuttons or by recourse to a stored signal in a memory in the data input unit 36, an indication of the number of axles on the vehicle. However, the information transmitted either in response to manual operation of the panel or by recourse to signal stored in memory, may include signals identifying the vehicle and/or an account number if a fee is to be levied for the use of the weighstation.

The generated signals are fed to the encoder 35 and converted into a form suitable for transmission by the transmitter 31. It is preferable, as discussed hereinafter, for the transmission of signals between the vehicle and the weighstation to be by way of modulated infra-red signals but the use of other forms of link, such as radio link, is feasible.

The "command" signal and the "number of axles" signal are received by the respective receiver 27 of the weighstation 18, demodulated by the demodulator 28 and fed to the data processor 23. On receipt of the data from the vehicle, the data processor 23 would usually, by means not relevant to the present invention, perform all the tasks necessary to clear the weighstation for operation, that is to say by ensuring that the relevant storage locations for axle weights in memory are clear, checking that the dynamic weighbeam is producing zero output and providing correction if it is not, and that the system is functioning properly in an automatic mode. These tasks are conveniently provided as a subroutine in the programming of the data processor 23.

On the assumption that the weighstation is ready for a weighing operation, the data processor initiates the issue of instructions for transmission to the vehicle. The content of this information, which is obtained from store, will depend on the arrangement of the particular weighstation but it is intended that the driver of the vehicle be informed either by means of an indication on his display 39 or by means of a pre-recorded message, how to proceed in order to ensure that his vehicle is properly weighed. In a simple case the driver will be told how to proceed over the weighing platform, in what direction and within a range of speeds, in order that the vehicle be properly driven over the weighbeam to produce an indication of the loading of each of the axles. The instructions issued to the driver either visually or audibly will normally include an instruction to proceed from the weighbeam to a location, such as adjacent or a little beyond the pylon 3, to await further message consequent on the operation of the weighstation. The content of such further message will be apparent from the following description.

It is presumed that the driver causes the vehicle to proceed in accordance with the instruction received by the vehicle from the weighstation. Thus the vehicle is caused to pass over the weighbeam and as each axle passes over the weighbeam, an indication of the axle load is obtained.

As was mentioned before, the operation of the weighbeam itself is in accordance with known practice. Thus the axle weights determined in succession by the weighbeam are signalled from the load cell bridge circuits associated with the weighbeam to the input amplifying and signal conditioning circuits 21, converted to digital form by the analogue-to-digital converter 22 and made available to the processor 23 for storage in memory.

The storage of the axle weights in memory may be dependent on the presence of several signals, the provision of at least some of which is dependent on the choice of the designer. In particular, the command signal provided when the vehicle first enters the weighing station may, if it includes an identification of the vehicle and an account number for the user, be checked for veracity against stored signals in the store 24. Thus for example if the signalled account number does not correspond to an account number held in store, the processor 23 may initiate the transmission to the vehicle of an indication that the vehicle is not accepted for weighing and should not proceed to be weighed. Conversely, if the veracity check is passed, it may provide a "vehicle acceptance" signal for use as now described.

As mentioned hitherto, the output signals from the load cells associated with the leading edge and trailing edge of the weighbeam may be fed to a comparator which produces a signal when the aforesaid output signals are equal; the existence of this signal, together with a "vehicle acceptance" signal may be required before the digital representation of a particular axle weight is fed into memory.

Provided that the system is working correctly, each axle weight determined by the weighbeam is stored in memory. The signals remain in memory, on the presumption that the weighing sequence is not "aborted" pending the arrival of two signals, one which is generated within the weighstation and the other of which is a "request for transmission" signal obtained by operation of the panel 37 by the driver of the vehicle. This latter signal is obtained by operation of the appropriate key or keys which condition the processor 34 to provide an appropriate signal for transmission by way of the encoder 35 and the transmitter 31.

However, the weighing sequence may be "aborted" for a variety of reasons. For example, it is desirable to interrupt the sequence and prevent ultimate read-out if the vehicle travels over the weighbeam at too great a speed. An "abort" signal may be generated by the control logic 29 in several ways. For example, by responding to the occurrence of signals from the load cells associated with the leading edge and trailing edge of the weighbeam and measuring the time delay between such signals it is readily possible to generate a signal denoting speed and by means of appropriate comparators to generate an "abort" signal if the indicated speed falls outside predetermined limits. Moreover, if the vehicle does not roll over the weighbeam correctly, for example the wheels at one side of the vehicle do not pass over the weighbeam, an incorrect measure of weight will be obtained. The aforementioned lateral position sensors, which may be of known form employing infra-red transmitters and detectors, may readily be employed to signal if the path of the vehicle is laterally offset from the centre line of the weighbeam too far, indicating that the vehicle has not been passed over the weighbeam correctly.

An "abort" signal, however derived, is used by the processor 23 first to inhibit the read-out of the stored axle weights, secondly to clear the relevant storage locations in memory, and thirdly to generate by means of the generator 25 and transmitter 26 a signal to the vehicle. Said signal preferably provides on the display 39 by any suitable technique a visual indication of the "abortion" of the weighing sequence and the reason (overspeed, incorrect centering or the like) for the "abortion" of the sequence. Of course, relevant abort decision logic would be stored in the store 24 for accessing under the control of the processor 23.

On the assumption that weighing proceeds correctly, read-out of the axle weight signals is contingent on the production of two signals, one from the weighstation terminal and the other from the vehicle. As regards the former, it will be recalled that the information originally transmitted to the weighstation from the vehicle includes an indication of the number of axles weighed. The weighstation routine will therefore include a comparison of the stored indication of the number of axles with the number of output signals from the aforementioned comparator so as to check that the correct number of axles have been weighed. On detection of parity the weighstation requires only the reception of a signal from the vehicle requesting the transmission of axle weight information. This signal may be generated by operation of the panel 37 so as to cause the vehicle terminal 24 to generate the requisite coded signal and effect transmission thereof by means of the encoder 35 and transmitter 31.

When therefore the weighstation processor 23 determines that the aforementioned two signals, denoting completion of weighing and denoting request for transmission of information, have been received, the processor effects read-out of the stored axle weight signals and the transmission thereof by way of the transmitter 26 to the vehicle.

It is readily feasible to provide, by means of the processor and appropriately stored signals in the store 24, for comparison of the axle loads signals with predetermined values in order to generate signals which indicate whether any particular axle loading is greater than that which is permitted. The computing routine of the processor 23 preferably also includes a totalising of the axle load signals to provide a derived signal indicating the total axle load of the vehicle and the comparison of the total load with a predetermined value in order to generate a signal denoting overloading if it has occurred. accordingly, when the weighstation transmits axle load data to the vehicle it preferably transmits signals denoting the individual axle loads together with signals denoting the total load and signals identifying the overloading, if any, particular axle or overloading of the total vehicle. Said signals may be accompanied by such data as date and time, which may be readily generated at the weighstation using known techniques, the relevant data being combined under the control of the processor 23 with the axle load data and the signals derived therefrom.

In this embodiment of the invention it is preferred that the axle load and overload data, date and time information be transmitted to the remote controller 19 and be displayed on the display 39. If there is any overloading, an alarm signal alongside the exceeded weight may be displayed; it may be accompanied by an audible alarm produced by the loudspeaker 38.

Alternatively however the remote controller may include a ticket printer which on reception of the axle load data and other data from the weighstation may be caused to print out a ticket containing the axle load data and other data thereon. Although, as has been indicated, various forms of electromagnetic radiation may be used for the conveyance of signals to and from the weighing station, it is preferable to employ an infra-red transmission link in order to avoid interference with any of the normal frequency bands used for wireless telegraphy.

For this purpose the transmission generator 25 and the vehicle encoder 35 may each be arranged to generate an output in a form suitable for driving a light emitting diode constituting the respective transmitter 26 or transmitter 31. Thus, in for example the transmission generator 25, the stored axle load data when read out may be converted into a series of pulses which serially represent each axle load.

Figure 3:
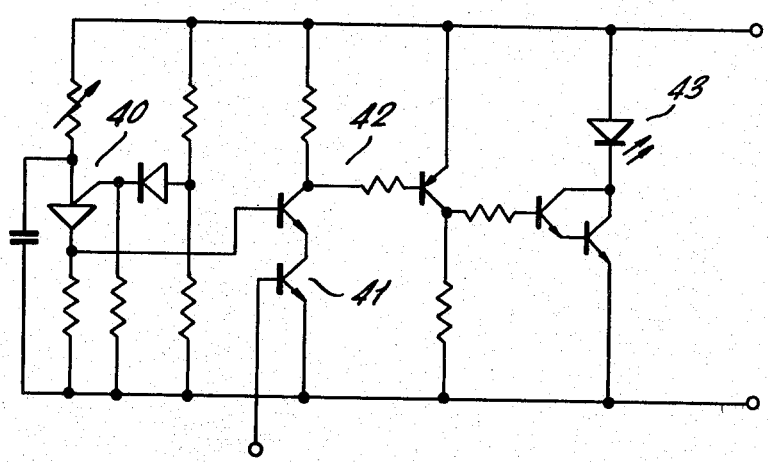
FIG. 3 is a diagram illustrating an encoder and transmitter.

FIG. 3 represents one form of transmitter suitable for use when the transmission link between the weighstation and the vehicle is infra-red. The series of pulses representing stored axle load data or whatever data is to be transmitted from the weighstation to the vehicle controls a gate 40 which controls the input to a drive amplifier 41 through which are fed sub-carrier pulses of a frequency of between 20 kilohertz and 50 kilohertz, generated by a pulse generator section 42. The resultant waveform is a train of pulses in computer compatible form, modulating the sub-carrier square wave pulses at a hundred percent modulation. This signal is used to drive a light emitting diode 43. The diode constitutes the signal transmitter and would be housed in the housing 4 so as to be in a convenient line of sight with the vehicle mounted receiver. A separate transmitter 26 may be provided in the housing 5 and be controlled in parallel from the same processor 23.

Figure 4:
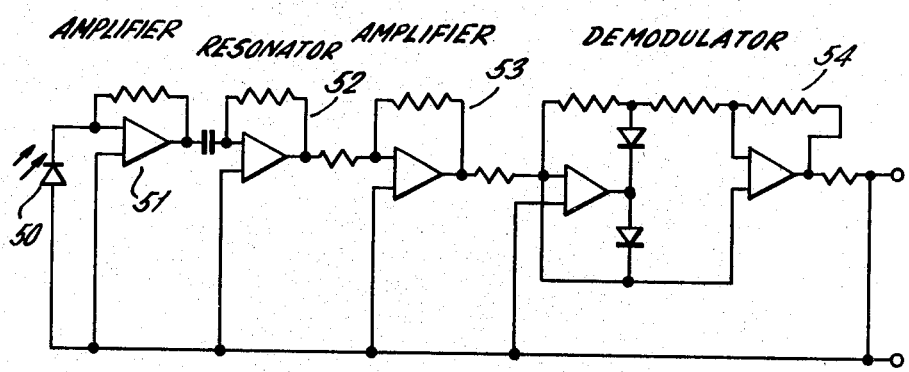
FIG. 4 is a schematic diagram illustrating a receiver.

FIG. 4 represents the receiver 32 and the demodulator 33 as provided in the vehicle and for use when the transmission link between weighstation and infra-red is infra-red. The receiver is constituted by a light sensitive diode 50 which drives an amplifier 51. Thus the electrical signal derived by the light sensitive diode 50 is amplified along with random signals from spurious light sources.

The output of the amplifier 51 is presented to a resonator in the form of a high gain amplifier with capacitative input impedance and resistive feedback impedance. The sub-carrier frequency, when presented to the resonator 52, causes violent oscillation of the respective amplifier for the duration of the sub-carrier, producing saturation of the amplifier and accordingly a square wave output representation of the presented data.

This amplifier 52 is so adjusted that it is able to resonate at the desired frequency when presented with a very low signal strength. The resultant output is a clean sub-carrier representation with a very high signal to noise ratio. The resultant signal is amplified by an ordinary high gain operational amplifier 53 and fed to a demodulator circuit 54 which provides full wave rectification and an output in the form of a noise free train of pulses in computer compatible code as generated.

We claim:

1. An axle-weighing system comprising in combination:
   (a) in a vehicle, a remote controller comprising:
      (1) means for transmitting a command signal and a signal denoting the number of axles possessed by the vehicle,
      (2) means for receiving signals, and
      (3) means coupled to the receiving means for processing received signals to provide indications of the loading on the axles of the vehicle, and
   (b) a weighstation comprising:
      (1) a weighbeam,
      (2) a receiver for receiving said command signal and said signal denoting the number of axles possessed by the vehicle,
      (3) means coupled to the beam and responsive to the command signal to provide signals denoting the individual axle loadings of the vehicle, and
      (4) a transmitter for transmitting the last-mentioned signals to said means for receiving in said remote controller.

2. An axle weighing system comprising in combination:
   (a) in a vehicle, a remote controller comprising:

(1) means for transmitting a command signal and a signal denoting the number of axles possessed by the vehicle;
(2) means for receiving signals;
(3) means coupled to the means for receiving for providing in response to first received signals instructions for a driver of the vehicle; and
(4) further means coupled to the receiving means for processing second received signals to provide indications of the loading on the axles of the vehicle; and (b) a weighstation comprising:
(1) a weighbeam;
(2) a receiver for receiving said command signal and said signal denoting the number of axles possessed by the vehicle;
(3) means responsive to the command signal to transmit to the remote controller first signals providing instructions to the driver of the vehicle;
(4) means coupled to the beam and responsive to the command signal to provide signals denoting the individual axle loadings of the vehicle; and
(5) means for transmitting the last-mentioned signals to said remote controller.

* * * * *